(12) United States Patent
     Ata

(10) Patent No.: US 11,103,393 B2
(45) Date of Patent: Aug. 31, 2021

(54) MANUAL MOVABLE BODY WITH WHEELS

(71) Applicant: Sanetaka Ata, Yokohama (JP)

(72) Inventor: Sanetaka Ata, Yokohama (JP)

( * ) Notice: Subject to any disclaimer, the term of this patent is extended or adjusted under 35 U.S.C. 154(b) by 322 days.

(21) Appl. No.: 16/312,086

(22) PCT Filed: Sep. 28, 2017

(86) PCT No.: PCT/JP2017/035183
§ 371 (c)(1),
(2) Date: Dec. 20, 2018

(87) PCT Pub. No.: WO2019/064416
PCT Pub. Date: Apr. 4, 2019

(65) Prior Publication Data
US 2019/0350781 A1  Nov. 21, 2019

(51) Int. Cl.
*A61G 5/02* (2006.01)
*B62M 11/16* (2006.01)
*B62B 3/00* (2006.01)
*B62B 7/00* (2006.01)
*B62B 5/04* (2006.01)

(52) U.S. Cl.
CPC ............ *A61G 5/021* (2013.01); *A61G 5/025* (2013.01); *B62B 3/00* (2013.01); *B62B 5/0438* (2013.01); *B62B 7/00* (2013.01); *B62M 11/16* (2013.01)

(58) Field of Classification Search
CPC ....... A61G 5/021; A61G 5/025; B62M 11/06; B62B 5/04; B62B 5/0438; B62B 5/0442
See application file for complete search history.

(56) References Cited

U.S. PATENT DOCUMENTS

| | | | | |
|---|---|---|---|---|
| 4,462,605 A | * | 7/1984 | Morgan | A61G 5/10 180/10 |
| 4,733,755 A | * | 3/1988 | Manning | A61G 5/10 188/2 F |
| 4,987,978 A | * | 1/1991 | Jungersen | A61G 5/1018 188/2 F |

(Continued)

FOREIGN PATENT DOCUMENTS

| JP | 4257904 B2 | 4/2009 |
|---|---|---|
| JP | 4997616 B2 | 8/2012 |

(Continued)

OTHER PUBLICATIONS

Japanese language International Search Report for corresponding PCT/JP2017/035183, dated Dec. 26, 2017 (3 pgs).

(Continued)

*Primary Examiner* — Tony H Winner
(74) *Attorney, Agent, or Firm* — Flynn Thiel, P.C.

(57) ABSTRACT

A manual movable body with wheels 10 which can be moved by manually rotating the wheels, comprising an upper body frame 12 supporting a heavy goods, a pair of travelling wheels 18, each of which is provided on the corresponding side of a lower body frame 14 which is not in contact with upper body frame 12, and is rotationally supported by a first horizontal rotation shaft 16 extending in the widthwise direction of the lower body frame 14, and a pair of abutting rollers, each of which is mounted on upper body frame 12, and is rotationally supported by a second horizontal rotation shaft extending in the widthwise direction of the upper body frame 12.

17 Claims, 9 Drawing Sheets

(56) References Cited

U.S. PATENT DOCUMENTS

| | | | | |
|---|---|---|---|---|
| 6,007,082 | A * | 12/1999 | Watwood | A61G 5/022 |
| | | | | 188/2 F |
| 6,253,880 | B1 * | 7/2001 | Faber | A61G 5/1018 |
| | | | | 188/2 F |
| 6,655,503 | B1 * | 12/2003 | Moody | A61G 5/10 |
| | | | | 188/2 F |
| 6,746,034 | B2 * | 6/2004 | Fowles | A61G 5/02 |
| | | | | 280/244 |
| 9,414,976 | B2 * | 8/2016 | Iwata | B60T 7/102 |
| 10,470,953 | B1 * | 11/2019 | Green | A61G 5/1086 |
| 10,492,965 | B2 * | 12/2019 | Weiss | A61G 5/1018 |
| 2003/0030244 | A1 * | 2/2003 | Choi | A61G 5/025 |
| | | | | 280/252 |
| 2004/0051272 | A1 * | 3/2004 | Wong | A61G 5/1018 |
| | | | | 280/244 |

FOREIGN PATENT DOCUMENTS

| | | |
|---|---|---|
| JP | 2013-094636 A | 5/2013 |
| JP | 5523037 B2 | 6/2014 |
| JP | 2014-161362 A | 9/2014 |
| JP | 2015-213723 A | 12/2015 |

OTHER PUBLICATIONS

Japanese language Written Opinion for corresponding PCT/JP2017/035183, dated Dec. 26, 2017 (6 pgs).

* cited by examiner

MANUAL MOVABLE BODY WITH WHEELS

TECHNICAL FIELD

The present invention relates to a manual movable body with wheels. More specifically, the present invention relates to a manual movable body with wheels which is capable of being manually operated in a manner the same as the one in which it is moved on a level road, in a case where it is moved on a downslope or upslope road.

BACKGROUND ART

Conventionally, the manual movable body with wheels which can be manually operated has been adopted as a wheelchair, a baby carriage, a handcart, etc.

Patent Documents 1 to 3 disclose such a conventional manual movable body with wheels.

The Patent Document 1 discloses an electrically activated wheelchair which includes a mount portion which detachably houses front wheels and a driving portion which electrically drives the wheelchair and is provided on the mount portion.

According to such an electrically activated wheelchair, it can be electrically activated by moving the front wheels (each front wheel, for instance) away from the road surface by the mount portion and driving the wheelchair by means of the driving portion mounted on the mount portion.

The Patent Document 2 discloses a wheelchair which includes a body frame including a seat, two gears with small diameters each of which is disposed on the lower portion of the body frame and in the front and rear positions of a supporting body mounted on the body frame to be rotationally supported, a manually operated gear with an activating bar rotationally supported on both upper sides of the body frame, a pair of travelling wheels each of which is disposed on the corresponding side of the body frame, a gear with a larger diameter which functions as an abutting roller and is provided on inner peripheral sides of the travelling wheels, and a hand rim with a smaller diameter than that of the travelling wheel which is disposed on the outside of the travelling wheels. The gear with the larger diameter is rotationally supported at three points by it being mated with the two gears with small diameters and the manually operated gear, so that the travelling wheels can be driven by manually operating either of the hand rim or the manually operated gear.

More specifically, in a case where the wheelchair is moved on a level floor inside a room, or on a level road, since the gear with the larger diameter provided on the inner peripheral sides of the travelling wheels is rotationally supported at three points by it being mated with the two gears with small diameters each of which is disposed on the lower portion of the body frame and in the front and rear positions, and the manually operated gear provided on both upper sides, the wheelchair can be moved by manually operating the hand rim disposed on the outside of the travelling wheels with a normal force. On the other hand, in a case where it crosses over a level difference between a roadway and a sidewalk, or it moves on an upslope road, it can be driven by manually operating the manually operated gear. In such a case, a deceleration effect due to a ratio of the number of teeth of the manually operated gear with that of the gear with a larger diameter is caused, so that a large rotation torque can be imparted to the travelling wheels by manually rotating the manually operated gear, and as a result, the level difference between the roadway and the sidewalk can be crossed over, or it can moved on the upslope road, with a small force. In addition, such an operation can be carried out by gripping the hand rim or gripping the activating bar of the manually operated gear, which can be easily selected, in accordance with the travelling condition.

The Patent Document 3 discloses a wheelchair which includes a boarding portion on which an user gets, a frame portion which supports the boarding portion, a wheel portion which is disposed on the frame portion and is rotated when it is moved, a braking portion which brakes the rotation of the wheel portion, and a displacement portion which switches the braking portion between a braking state and a non-braking state. The boarding portion is configured so as to vary, based on the seated condition, or the non-seated condition of the user, and the displacement portion is configured so as to vary, based on the variation of the boarding portion, whereby the braking portion is switched between the braking state and the non-braking state, based on the variation of the displacement portion. A displacement control portion which displaces the displacement portion, irrespective of the variation of the boarding portion is provided. The displacement control portion is adapted to come in abutment with the displacement portion against a biasing force exerting on the displacement portion to displace the displacement portion, and thus, to maintain the displacement state. The displacement control portion is adapted to come in abutment with the displacement portion disposed at a position where the braking portion is in the braking state to make the displacement portion displace to a position where the braking portion becomes the non-braking state. A receiving portion for the displacement control portion is formed on a portion of the displacement portion against which the displacement control portion abuts under a state that the displacement control portion makes the displacement portion displace to a position where the braking portion is in the non-braking state.

According to the above structure, the boarding portion on which the user boards, the frame portion which supports the boarding portion, the wheel portion which is disposed on the frame portion and is rotated upon the movement of the wheelchair, the braking portion which brakes the rotation of the wheel portion, and the displacement portion which switches the braking portion between the braking state and the non-braking state, so that the boarding portion is adapted to vary, based on the seated state or the non-stated state of the user, the displacement portion is adapted to vary, based on the variation of the boarding portion, whereby the braking portion is adapted to be switched between the braking state and the non-braking state, based on the variation of the displacement portion.

Accordingly, when the user takes a seat on the boarding portion, the braking portion automatically becomes the non-braking state, while, when the user stands up from the boarding portion, that is, the non-seated state, the braking portion automatically becomes the braking state.

Accordingly, even if the user utilizing the wheelchair stops it after starting moving it, and forgets to operate the manual lock, etc. arranged on the wheel portion when the user stands up, the wheel portion automatically is in the braking state. Therefore, the user can be prevented from being overturned due to the fact that the wheelchair rearwardly moves when the user stands up.

In addition, since the wheel portions are switched to the non-braking state if the user takes a seat, the wheelchair can be moved even if the user does not cancel the lock, etc.

However, the wheelchairs disclosed in the Patent Publications 1 to 3 include following technical problems.

Firstly, in the wheelchair disclosed in the Patent Publication 1, even if the manual operating state can be switched to the electrically activated state, the driving portion which switches between these states is necessary, so that the cost and the weight of the wheelchair are increased, and the selection between the manual operating state and the electrically activated state cannot be possible after the electrically activated state is selected.

Secondly, in the wheelchair disclosed in the Patent Publication 2, in case of the slope, even if it is possible to cross over the stepped portion between the roadway and the sidewalk, or to climb the upslope road with a small force, it automatically downwardly moves when the user takes his or her hand off of the travelling wheels, so that there is a risk that the user gets seriously injured.

Thirdly, in the wheelchair disclosed in the Patent Publication 3, even if the braking state is automatically attained when the user is in a non-seated state, so that the wheelchair can be prevented from automatically moving, in case of the slope, it automatically downwardly moves when the user takes his or her hand off of the travelling wheels, so that there is a risk that the user gets seriously injured, like the Patent Publication 2.

In case of the wheelchairs, physically handicapped persons often use them, so it is preferred that a force for manually moving the wheelchairs be as small as possible. In particular, in a case of where the wheelchair is moved on an upslope road by manually operating it, the wheelchair which the users are capable of upwardly moving little by little, and of taking rests when they become tired with hands-off from the travelling wheels without a need to hold the travelling wheels by hand, while, which the user are capable of upwardly moving again by manually operating it, has been desired.

In such case, in case of a bicycle, for instance, the brake can be carried out by pressing a rubber pad against an annular peripheral inner surface of a rim of a rubber tire, while, the brake can be cancelled by removing the rubber pad from the annular peripheral inner surface.

Such being the case, a need for the braking operation, instead of an automatic braking is not a burden for non-handicapped users, but, it can be a burden for users solely utilizing the wheelchair, even when it is moved at a low speed, so that the wheelchair which can be simply operated on a sloped road without a need to mind such a braking operation and without a need for caregivers has been desired.

Patent Document 1: Japanese Patent No. 4997616
Patent Document 2: Japanese Patent No. 4257904
Patent Document 3: Japanese Patent No. 5523037

DISCLOSURE OF THE INVENTION

Problems to be Solved by the Invention

In view of the technical problem described above, it is an object of the present invention to provide a manual movable body with wheels which is capable of being manually operated in a manner the same as the one in which it is moved on a level road, in a case where it is moved on a downslope road.

In view of the technical problem described above, it is an object of the present invention to provide a manual movable body with wheels which is capable of being manually operated in a manner the same as the one in which it is moved on a level road, in a case where it is moved on a downslope road or an upslope road.

In view of the technical problem described above, it is an object of the present invention to provide a manual movable body with wheels which is capable of being manually operated in a manner the same as the one in which it is moved on a level road, while at the same time of securing its stability, in a case where it is moved on a downslope road or an upslope road.

Solutions to the Problems

In view of the above technical problems, according to an aspect of the invention, there is provided a manual movable body with wheels which can be moved by manually rotating the wheels, comprising an upper body frame for supporting heavy goods, a pair of travelling wheels, each of which is provided on the corresponding side of a lower body frame which is not in contact with said upper body frame, and is rotationally supported by a first horizontal rotation shaft extending in the widthwise direction of the lower body frame, and a pair of abutting rollers, each of which is mounted on said upper body frame, and is rotationally supported by a second horizontal rotation shaft extending in the widthwise direction of the upper body frame, each of the pair of abutting rollers is positioned on a front side of said manual movable body with wheels relative to a line between said first horizontal rotation shaft and a point of contact of said travelling wheel with a road surface in such a way that its rotation force can be transmitted to the corresponding travelling wheel, while the upper body frame can be supported thereby and it is provided so as to be in contact with the corresponding travelling wheel at a predetermined center angle about the first horizontal rotation shaft without causing slippage relative to the corresponding travelling wheel, and a load of heavy goods supported by said upper body frame is applied on a point of contact between each of said pair of abutting rollers and the corresponding travelling wheel via said pair of abutting rollers without being applied on said first horizontal rotation shaft for said travelling wheels, whereby, in a case where said manual movable body with wheels is on a downslope road surface, a force in a rotation direction reverse to a rotation direction of said pair of travelling wheels in a case where said manual movable body with wheels is downwardly moved is applied on said pair of travelling wheels via said pair of abutting rollers.

According to the manual movable body with wheels including the above structure, like a normal conventional manual movable body with wheels, this movable body can be moved by manually rotating the wheels, in case of a level road.

In case of a downslope road, a pair of travelling wheels inevitably rotate about the first horizontal rotation shaft in such a way that the manual movable body with wheel is downwardly moved, and since each of the pair of abutting rollers is positioned on a front side of said manual movable body with wheels relative to a line between said first horizontal rotation shaft and a point of contact of said travelling wheel with a road surface in such a way that its rotation force can be transmitted to the corresponding travelling wheel, while the upper body frame can be supported thereby and is provided so as to be in contact with the corresponding travelling wheel at a predetermined center angle about the first horizontal rotation shaft without causing slippage relative to the corresponding travelling wheel, and a load of heavy goods supported by said upper body frame is applied on a point of contact between each of said pair of abutting rollers and the corresponding travelling wheel via said pair of abutting rollers without being applied on said first horizontal rotation shaft for said travelling wheels, each of said pair of abutting rollers is caused to rotate in the direction reverse to the direction in which the travelling wheels rotate, whereby this rotation force is applied on the corresponding travelling wheel via each of said pair of abutting rollers, said manual movable body with wheels can remain in a place with a hand-off by an user without a need to manually hold the travelling wheels so as not to downwardly move, like a case of the level road.

Additionally, it is preferred that each of said pair of abutting rollers is shaped to be a gear, and a pair of third gears, each of which mates with the corresponding abutting roller and is mounted on the corresponding travelling wheel, is provided so as to integrally rotate with said pair of traveling wheels in a concentric manner.

Additionally, it is preferred that the manual movable body with wheels further comprises a pair of first sprockets each of which integrally rotates with the corresponding travelling wheel in a concentric manner, a pair of first gears each of which integrally rotates with the corresponding abutting roller in a concentric manner, a pair of second gears each of which includes a gear shape the same as that of the corresponding first gear and mates with the corresponding a first gear, a pair of second sprockets each of which integrally rotates with the corresponding second gear in a concentric manner, a pair of chains each of which is wound over between the corresponding first and second sprockets, and a pair of tension imparting mechanisms each of which imparts a tension force to the corresponding chain, a ratio of a diameter of said travelling wheel with that of said abutting roller is set to be the same as a ratio of the number of teeth of said first sprocket with that of said second sprocket, whereby, in a case where said manual movable body with wheels is on a downslope road surface, a force in a rotation direction reverse to a rotation direction of said pair of travelling wheels in a case where said manual movable body with wheels is downwardly moved is applied on said pair of travelling wheels via said pair of chains.

Additionally, it is preferred that a rachet claw is provided on each of said second gears so as to bite between its teeth to allow its rotation only in one direction.

Additionally, it is preferred that said manual movable body with wheels is a wheelchair including a seat at said upper body frame, said first horizontal rotation shaft is provided on the rear side in the longitudinal direction of said manual movable body, said upper body frame is provided so as to rotate about said first horizontal rotation shaft relative to said lower body frame, and said manual movable body with wheels further comprises a mechanism for holding the upper body frame which adjustably holds said upper body frame at a predetermined rotated position, in accordance with an inclination angle of the road surface on which said manual movable body with wheels is moved.

According to the manual movable body with wheels including the above structure, in a case where it is moved on a downslope road or an upslope road, the surface of the seat can be maintained to be horizontal, like a case of a level road, by adjustably holding the predetermined rotated position of the upper body frame by rotating the upper body frame about the first horizontal rotation shaft, in accordance with the inclination angle of the road surface on which it is moved, by means of the mechanism for adjustably holding the upper body frame. Accordingly, in a case where it is moved on a downslope road or an upslope road, by reducing an overturn moment applying to the manual movable body with wheels, it can be manually operated in a manner the same as a case where it is moved on the level road, while the same time, the stability of the manual movable body with wheels can be secured.

Additionally, it is preferred that said lower body frame comprises a pair of lower frameworks each of which includes an elongate lower opening, and a widthwise lower frame connecting said pair of lower frameworks, said first horizontal rotation shaft extends between opposed side surfaces of said pair of lower frameworks, and each of said pair of travelling wheels is provided in a space between said pair of lower frameworks.

Additionally, it is preferred that said upper body frame comprises a pair of upper frameworks each of which includes an elongate upper opening and constitutes an arm rest, and a widthwise upper frame connecting said pair of upper frameworks, said second horizontal rotation shaft extends between opposed side surfaces of said pair of upper frameworks, and a seat is provided in a space between said pair of upper frameworks.

Additionally, it is preferred that the manual movable body with wheels further comprises a pair of vertical frames each of which extends from an outer surface of the corresponding one of said pair of upper body frames toward the corresponding one of said pair of lower body frames, a notch is provided on a lower end of each of said vertical frames so as to hold said first horizontal rotation shaft, a gap is secured between the upper end of the corresponding notch and said first horizontal rotation shaft in a situation where each of said pair of abutting rollers is in contact with the corresponding travelling wheel, and the elongate lower opening of said lower body frame is aligned with the elongate upper opening of said upper body frame, whereby each of said travelling wheels, said first and second sprockets, said first and second gears, and said chains are disposed in a vertical space between the corresponding elongate upper and lower openings.

Additionally, it is preferred that each of said pair of first sprockets includes a diameter smaller that of the corresponding travelling wheel and is provided inside relative to the corresponding travelling wheel.

Additionally, it is preferred that each of said pair of abutting rollers is provided on the front side of said manual movable body with wheels relative to said first horizontal rotation shaft for said travelling wheels at the predetermined center angle of 30 degrees to 60 degrees relative to a horizontal line, so as to circumscribe the corresponding travelling wheel from outside, and a pair of auxiliary wheels are provided on said pair of lower body frames in such a way that each of the pair of auxiliary wheels is provided on a front end of the corresponding lower body frame.

Additionally, it is preferred that each of said pair of abutting rollers is provided on the rear side of said manual movable body with wheels relative to said first horizontal rotation shaft of said travelling wheels at the predetermined center angle of 30 degrees to 60 degrees relative to a horizontal line, so as to circumscribe the corresponding travelling wheel from outside, and a pair of auxiliary wheels are provided on said pair of lower body frames in such a way that each of the pair of auxiliary wheels is provided on a rear end of the corresponding lower body frame.

Additionally, it is preferred that the manual movable body with wheels further comprises a hand rim portion by which a rotation force can be manually transmitted to said traveling wheels is provided on at least either said pair of travelling wheels, or said pair of abutting rollers.

Additionally, it is preferred that said manual movable body with wheels is a baby carriage including a gripping portion at its rear portion for hand-push.

Additionally, it is preferred that said manual movable body with wheels is a handcart including a gripping portion at its rear portion for hand-push, and a load-carrying platform is provided on said upper body frame.

Additionally, it is preferred that each of said pair of travelling wheels includes a tire portion and an annular rim portion supporting the tire portion, each of said pair of abutting rollers is provided on an inner space of an annular rim portion of the corresponding travelling wheel so as to inscribe the corresponding travelling wheel at a predetermined center angle about said first horizontal rotation shaft in such a way that said upper body frame can be supported thereby and the rotational force of each of said pair of the abutting rollers can be transmitted to the corresponding travelling wheel.

Additionally, it is preferred that the manual movable body with wheels further comprises a mobile framework bridging upper surfaces of inner side plates of said pair of lower frames to be movably rested on the upper surfaces in a sliding manner in the longitudinal direction of the manual movable body with wheels, a stair portion including a plurality of stepped portions at its upper portion each of which gets higher in the forward direction of the manual movable body with wheels, a biasing portion biasing said mobile framework in the longitudinal direction of the manual movable body with wheels, and a locking portion provided one of said pair of upper frames and locks against said plurality of stepped portions from behind, whereby said inclination angle of said upper body frame can be adjusted.

Additionally, it is preferred that said plurality of stepped portions includes a rear portion in the longitudinal direction of the manual movable body with wheels for the upward slope road surface, a front portion in the longitudinal direction of the manual movable body with wheels for the downward slope road surface, and an intermediate portion for the level road surface.

Additionally, it is preferred that a position of the point of contact between each of the pair of abutting rollers and the corresponding travelling wheel can be adjusted by said locking portion.

Additionally, it is preferred that the manual movable body with wheels further comprises a spring provided between said upper body frame and said first horizontal rotation shaft so as to restrict a vertical movement of said upper body frame relative to said lower body frame.

BEST MODE FOR CARRYING OUT THE INVENTION

Preferred embodiments of the present invention will be described in detail below with reference to the accompanying drawings. In this connection, although the preferred various technical limitations are put in the following embodiments, since they are merely preferred examples for the present invention, the scope of the present invention is not limited to these embodiments, unless the description that such technical limitations are to limit the present invention is indicated in the following descriptions, in particular.

As shown in FIG. 1, a manual movable body 10 with wheels which is moved by manually rotating the wheels is a wheelchair which generally comprises a body frame, a seat 20 provided on the body frame, and the wheels provided on the body frame.

The manual movable body 10 with wheels is shaped to be line-symmetric relative to a central line in its longitudinal direction, so that a structure around a left travelling wheel 18 is the same as that of a right travelling wheel 18. Therefore, one of the structures will be described, and the explanation of the other of the structures will be omitted. In this connection, in the drawings, with respect to a pair of elements which are arranged to be a line-symmetric relative to a central line in the longitudinal direction of the manual movable body 10 with wheels, symbols A, B are attached to a common reference number for indicating the pair of elements, respectively.

As shown in FIG. 2, the body frame comprises an upper body frame 12 supporting heavy goods including a seat 20 and a lower body frame 14 which is non-contact with the upper body frame 12, and, as described below, the upper body frame 12 is provided so as to rotate about a first horizontal rotation shaft 16 which is provided on the rear side in the longitudinal direction of the manual movable body 10 relative to the lower body frame 14.

The wheels include a pair of travelling wheels 18 and a pair of auxiliary wheels 120 (described hereinafter). Each of the pair of travelling wheels 18 is provided on the corresponding side of the lower body frame 14, and is rotationally supported about a first horizontal rotation shaft 16 extending in the widthwise direction of the lower body frame 14.

Each of the pair of travelling wheels 18 includes a tire 70 made of rubber, etc., a rim portion 72 made of metal which supports the tire 70, and a spoke portion 74 made of metal, etc. Each of the pair of travelling wheels 18 includes a hand rim portion (not shown) which is used by an user when he or she rotates the travelling wheels 18, and the hand rim portion is shaped to be arcuate so as to be fixed on the rim portion 72.

The user seated on the seat 20 can move the wheelchair 10 in its longitudinal direction by gripping the hand rim portions 75 on the travelling wheels 18 to rotate the travelling wheels 18.

As shown in FIGS. 1 to 4, right and left handles 76 are provided on a rear portion of the seat 20 of the manual movable body 10 with wheels. A caregiver who takes care of the user, for instance, grips the right and left handles 76 to operate the manual movable body 10 with wheels.

A foot plate 78 on which the user rests his or her foot is provided on a front of the seat 20.

In this connection, the hand rim portion 75 may be provided on a pair of abutting rollers 100 which is described hereinafter.

The upper body frame 12 comprises a pair of upper frameworks 32 each of which includes an elongate upper opening 30 and constitutes an arm rest, and a widthwise upper frame 34 connecting pair of upper frameworks 32, a second horizontal rotation shaft 36 described below extends between opposed side surfaces 27 of pair of upper frameworks 32, and a seat 20 is provided in a space 28 between the pair of upper frameworks 32.

On the other hand, the lower body frame 14 comprises a pair of lower frameworks 24 each of which includes an elongate lower opening 22, and a widthwise lower frame 26 connecting the pair of lower frameworks 24, the first horizontal rotation shaft 16 extends between opposed side surfaces 29 of the pair of lower frameworks 24, and each of the pair of travelling wheels 18 is provided in a space 25 between the pair of lower frameworks 24.

As shown in FIG. 5, with respect to a mechanism for adjustably holding the upper body frame 112, it comprises a pair of vertical frames 38 each of which extends from an outer surface of the corresponding one of the pair of upper body frames 12 toward the corresponding one of the pair of lower body frames, a notch 40 is provided on a lower end 39 of each of the vertical frames 38 so as to hold the first horizontal rotation shaft 16 and the elongate lower opening 22 of the lower body frame 14 is aligned with the elongate upper opening 30 of the upper body frame 12.

A movement in the longitudinal direction of the manual movable body with wheels 10 of the upper body frame 12 relative to the lower body frame 14 can be prevented by the fact that the notches 40 hold the first horizontal rotation shaft 16 in the longitudinal direction of the manual movable body with wheels 10. In addition, a movement in the vertical direction of the manual movable body with wheels 10 of the upper body frame 12 relative to the lower body frame 14 can be prevented by a spring 43 provided between the first horizontal rotation shaft 16 and the upper body frame 12 in such a way that a clearance between an upper end of each of the notches 40 and the first horizontal rotation shaft 16 is secured, while each of the pair of abutting rollers 100 described below is kept to circumscribe an outer peripheral surface of the corresponding travelling wheel 18.

The mechanism for adjustably holding the upper body frame 112 further comprises a mobile framework 46 bridging upper surfaces 44 of inner side plates 42 of the pair of lower frames 24 to be movably rested on the upper surfaces 44 in a sliding manner in the longitudinal direction of the manual movable body with wheels 10, a stair portion including a plurality of stepped portions 50 at its upper portion which get higher in the forward direction of the manual movable body with wheels 10, a biasing portion 54 biasing said mobile framework 46 in the longitudinal direction of the manual movable body with wheels 10, and a locking portion 56 which is provided on one of the pair of upper frames 32 and locks against the plurality of stepped portions 50 from behind, whereby the inclination of the upper body frame 12 can be adjusted.

The biasing portion 54 may be constituted by a normal spring, and a lever 124 may be preferably provided in such a way that the mobile framework 46 can slide in the longitudinal direction of the manual movable body with wheels 10 by activating the lever 124, whereby the locking portion 56 is made to selectively lock against either of the plurality of stepped portions 50. In this connection, the mobile framework 46 is configured so as to be movable in the longitudinal direction of the manual movable body with wheels 10 by a guiding portion 49.

The plurality of stepped portions 50 includes a rear portion in the longitudinal direction of the manual movable body with wheels 10 for the upward slope road surface, a front portion in the longitudinal direction of the manual movable body with wheels 10 for the downward slope road surface, and an intermediate portion for the level road surface.

As shown in FIG. 6, the upper body frame 12 can be adjustably held at the predetermined rotated position, in accordance with an inclination angle θ of the road on which the manual movable body with wheels 10 is moved, by means of the mechanism for adjustably holding the upper body frame 112.

More specifically, as shown in FIG. 6(A), in a case where the road is level, the mobile framework 46 is slid in the longitudinal direction of the manual movable body with wheels 10 by operating the lever 124, so that the locking portion 56 can be positioned on the stepped portion for the level road among the plurality of stepped portions 50, whereby the seat 20 can be maintained at a horizontal level.

As shown in FIG. 6(B), in a case where the road is upslope, the locking portion 56 can be positioned on the stepped portion for the upslope road among the plurality of stepped portions 50, whereby the seat 20 can also be maintained at a horizontal level. As shown in FIG. 6(C), in a case where the road is downslope, the locking portion 56 can be positioned on the stepped portion for the downslope road among the plurality of stepped portions 50, whereby the seat 20 can also be maintained at a horizontal level.

Next, a structure around the travelling wheels 18, which is the technical feature of the present invention, will be explained about.

A mechanism by which the manual movable body with wheels 10 is restricted to forwardly move in the downward direction on the downslope road, for instance, without the operation of the braking mechanism, irrespective of the inclination of the road on the manual movable body with wheels 10 is moved, is generally constituted by the pair of abutting rollers 100, a pair of first gears 102, a pair of second gears 106, a pair of second sprockets 108, a pair of the first sprockets 102 and a pair of chains 110.

More specifically, as shown in FIG. 5, each of the pair of abutting rollers 100 is mounted on the upper body frame 12, and is rotationally supported by the second horizontal rotation shaft 36 extending in the widthwise direction of the upper body frame 12. Each of the pair of abutting rollers 100 is positioned on a front side of the manual movable body with wheels 10 relative to a line L between the first horizontal rotation shaft 16 and a point N of contact of the travelling wheel 18 with a road surface in such a way that its rotation force can be transmitted to the corresponding travelling wheel 18, while the upper body frame 12 can be supported thereby and it is provided so as to be in contact with the corresponding travelling wheel 18 at a predetermined center angle α about the first horizontal rotation shaft 16 without causing slippage relative to the corresponding travelling wheel 18.

The thickness of each of the pair of abutting rollers 100 is preferred to be equal to, or thicker than that of the corresponding travelling wheel 18.

Some coating is applied on either of, or both of the surfaces of, the pair of the abutting rollers 100 and the outer surfaces of the travelling wheels 18 so as to prevent a slippage between the surfaces of the pair of the abutting rollers 100 and the outer surfaces of the travelling wheels 18.

Such being the case, as described below, a load of the heavy goods supported by the upper body frame 12 is applied on a point N of contact between each of the pair of abutting rollers 100 and the corresponding travelling wheel 18 via the pair of abutting rollers 100 without being applied on the first horizontal rotation shaft 16 of the travelling wheels 18, whereby a force in a rotation direction reverse to a rotation direction of the pair of travelling wheels 18 which is determined in accordance with the inclination angle θ of the road surface on which the manual movable body with wheels 10 is moved is adapted to be applied on the pair of travelling wheels 18 via the pair of abutting rollers 110.

In this connection, the point N of contact between each of the pair of abutting rollers 100 and the corresponding travelling wheel 18 can be adjusted by adjusting the length of the locking portion 56.

As shown in FIG. 5, each of the pair of abutting rollers 100 is provided on the front side of the manual movable body with wheels 10 relative to the first horizontal rotation shaft 16 for the travelling wheels 18 and at the predetermined center angle α of 30 degrees to 60 degrees relative to a horizontal line, so as to circumscribe the corresponding travelling wheel 18 from outside, and a pair of auxiliary wheels 120 are provided on the lower body frame 14 in such a way that each of the pair of auxiliary wheels 120 is provided on a front end of the corresponding lower body frame 14.

In a case where the predetermined center angle α is smaller than 30 degrees, or larger than 60 degrees, as described below, it is difficult for each of the pair of abutting rollers 100 to downwardly move along the outer peripheral surface of the corresponding travelling wheel 18 from the point N of contact with the corresponding travelling wheel 18 in a rolling manner.

In this respect, the predetermined central angle α is preferably set, in accordance with the load applied on the pair of abutting rollers 100, that is to say, the weights of the user, the seat 20, and the upper body frame 12.

In addition, the manual movable body with wheels 10 further comprises a pair of first gears 104 each of which integrally rotates with the corresponding abutting roller 100 in a concentric manner, and a pair of second gears 106 each of which includes a gear shape the same as that of the corresponding first gear 104 to mate with the corresponding first gear 104. Further, a rachet claw 116 is provided on each of the pair of second gears 106 so as to bite between its teeth to allow its rotation only in one direction (refer to an arrow X in FIG. 5). As described below, in a case where the manual movable body with wheels 10 is on the upward slope, the manual movable body with wheels 10 is prevented from rearwardly moving in the downward direction by means of the rachet claw 116, even if the user removes his or her hand from the travelling wheels 18, while, it can climb the upward slope by the user's manually rotating of the travelling wheels. In this connection, the biting operation of the rachet claw 116 is carried out by a lever 126 biased by a spring 47.

In addition, a pair of first sprockets 102 each of which integrally rotates with the corresponding travelling wheel 18 in a concentric manner, a pair of second sprockets 108 each of which integrally rotates with the corresponding second gear 106 in a concentric manner, and a pair of chains 110 each of which is wound over between the corresponding first and second sprockets 102, 108 are provided, and a ratio of a diameter of the travelling wheel 18 with that of abutting roller 100 is set to be the same as a ratio of the number of teeth of the first sprocket 102 with that of the second sprocket 108. This causes a tensioning state of the one side of the chain portion between each of the first sprocket 102 and the corresponding second sprocket 108, and that of the other side of the chain portion to be constantly kept equal.

Each of the first sprockets 102 includes a diameter smaller that of the corresponding travelling wheel 18 and is provided inside relative to the corresponding travelling wheel 18.

A pair of tension imparting mechanisms 118 are provided on the pair of chains 110, each of which imparts a tension force to the corresponding chain 110.

More specifically, each of the tension imparting mechanisms 118 is a sprocket provided near the corresponding abutting roller 100, and as shown in FIG. 5, by setting the central position of each of the sprockets 118 to apply it to the corresponding chain 110, a tension force is applied to the chain 110 in such a way that the lower portion of the corresponding chain 110 is upwardly recessed near the corresponding abutting roller 100.

In a case where manual movable body with wheels 10 is on the downslope road, it can be prevented from forwardly moving in the downward direction with a hand-off by the user from the travelling wheels 18, by means of the pair of tension imparting mechanisms 118, as described below.

Each of the travelling wheels 18, the corresponding first and second sprockets 102, 108, the corresponding first and second gears 104, 106, and the corresponding chain 110 are disposed to be parallel and in a vertical space between the corresponding elongate upper and lower openings 22, 30.

As an alternative to a mechanism in which the rotational force is transmitted to the pair of travelling wheels 18 via the chains 110 by means of the first and second sprockets 102, 108, the first and second sprockets 102, 108, and the chains 110 may be replaced by first and second timing pulleys, and a timing belt, respectively.

As an additional alternative to the mechanism in which the rotational force is transmitted to the pair of travelling wheels 18 via the chain 110 by means of the first and second sprockets 102, 108, the first and second sprockets 102, 108, and the chains 110 may be replaced by first and second bevel gears, and a rod at one end of which a bevel gear mating with the first bevel gear is provided, and at the other end of which another bevel gear mating with the second bevel gear is provided, respectively.

Still alternatively, each of the pair of abutting rollers 100 may be provided on the rear side of the manual movable body with wheels 10 relative to the first horizontal rotation shaft 16 for the travelling wheels 18 and at the predetermined center angle α of 30 degrees to 60 degrees relative to the horizontal line, so as to circumscribe the corresponding travelling wheel 18 from outside, and the pair of auxiliary wheels 120 may be provided on the lower body frame 14 in such a way that each of the pair of auxiliary wheels 120 is provided on a rear end of the corresponding lower body frame 14. The reason for the predetermined center angle α of 30 degrees to 60 degrees is the same as the case where each of the pair of abutting rollers 100 may be provided on the front side of the manual movable body with wheels 10 relative to the first horizontal rotation shaft 16 for the travelling wheels 18.

In this connection, the structure of the body frame and the travelling wheels may be made of metal, or rigid resin.

The effect of the manual movable body with wheels 10 including the above structure will be described below, with reference to the drawings.

As shown in FIG. 7(A), in case of the upslope road, the manual movable body with wheels 10 is about to rearwardly move in the downward direction, so that the pair of travelling wheels 18 are caused to rotate in the direction indicated by an arrow A.

On the other hand, the load of the upper body frame 12 is applied not on the first horizontal rotation shaft 16 for the pair of travelling wheels 18, but on the point N of contact between each of the pair of abutting rollers 100 and the corresponding travelling wheel 18.

Accordingly, the pair of abutting rollers 100 are caused to downwardly move along the outer peripheral surfaces of the pair of travelling wheels 18 from the point N of contact in a rolling manner, in other words, to rotate in the direction indicated by an arrow B.

This causes the pair of abutting rollers 100 and the pair of first gears 104 integral with the abutting rollers 100 to rotate in the direction indicated by an arrow B, whereby the pair of the second gears 106 mating with the pair of the first gears 104 and the pair of the second sprockets 108 integral with the pair of the second gears 106 are caused to rotate in the direction indicated by an arrow C, so that the rotation force of the pair of the second sprocket 108 is transmitted to the pair of first sprockets 102 via the pair of chains 110, and as a result, the pair of travelling wheels 18 integral with the pair of first sprockets 102 are caused to rotate in the direction indicated by an arrow A. However, this rotation is blocked by the pair of rachet claws 116 biting between the teeth of the pair of the second gears 106, so that the downward movement of the manual movable body with wheels 10 is prevented, and thus, it remains in a place.

On the other hand, in a case where the user climbs the upslope road by manually rotating the pair of travelling wheels 18 in the direction reverse to the direction indicated by the arrow A, since the pair of rachet claws 116 do not block such a rotation of the pair of the second gears 106 in the direction reverse to the direction indicated by the arrow C, the manual movable body with wheels 10 can climb the upslope road.

In contrast, as shown in FIG. 7(B), in case of the downslope road, the manual movable body with wheels 10 is about to rearwardly move in the downward direction, so that the pair of travelling wheels 18 are caused to rotate in the direction indicated by an arrow D.

On the other hand, the load of the upper body frame 12 is applied not on the first horizontal rotation shaft 16 of the pair of travelling wheels 18, but on the point N of contact between each of the pair of abutting rollers 100 and the corresponding travelling wheel 18.

Accordingly, the pair of abutting rollers 100 are caused to downwardly move along the outer peripheral surfaces of the pair of travelling wheels 18 from the point N of contact in a rolling manner, in other words, to rotate in the direction indicated by an arrow E.

This causes the pair of abutting rollers 100 and the pair of first gears 104 integral with the abutting rollers 100 to rotate in the direction indicated by an arrow E, whereby the pair of the second gears 106 mating with the pair of the first gears 104 and the pair of the second sprockets 108 integral with the pair of the second gears 106 are caused to rotate in the direction indicated by an arrow F, so that the rotational force of the pair of the second sprockets 108 is transmitted to the pair of first sprocket 102 via the pair of chains 110, and as a result, the pair of travelling wheels 18 integral with the pair of first sprockets 102 are caused to rotate in the direction reverse to the direction indicated by an arrow D. The downward movement of the manual movable body with wheels 10 is prevented, and thus, it remains in a place, by tensioning the pair of chains 110 by means of the tension imparting mechanisms 118.

According to the manual movable body with wheels 10 including the above structure, like a normal conventional manual movable body with wheels 10, this movable body can be moved by manually rotating the wheels, in case of a level road.

In case of a downslope road, a pair of travelling wheels 18 inevitably rotate about the first horizontal rotation shaft 16 in such a way that the manual movable body with wheel is downwardly moved, and since each of the pair of abutting rollers 100 is positioned on a front side of said manual movable body with wheels 10 relative to a line between said first horizontal rotation shaft 16 and a point N of contact of said travelling wheel 18 with a road surface in such a way that its rotational force can be transmitted to the corresponding travelling wheel 18, while the upper body frame 12 can be supported thereby and is provided so as to be in contact with the corresponding travelling wheel 18 at a predetermined center angle about the first horizontal rotation shaft 16 without causing slippage relative to the corresponding travelling wheel 18, and a load of heavy goods supported by said upper body frame 12 is applied on a point of contact between each of said pair of abutting rollers 100 and the corresponding travelling wheel 18 via said pair of abutting rollers 100 without being applied on said first horizontal rotation shaft 16 for said travelling wheels 18, each of said pair of abutting rollers 100 is caused to rotate in the direction reverse to the direction in which the travelling wheels 18 rotate, whereby this rotational force is applied on the corresponding travelling wheel 18 via each of said pair of abutting rollers 100, said manual movable body with wheels 10 can remain in a place with a hand-off by an user without a need to manually hold the travelling wheels 18 so as not to downwardly move, like a case of the level road.

On the other hand, in case of the upslope road, since the rotation of the travelling wheels 18 in the direction in which they rearwardly moved in the downward direction is blocked by the rachet claws 116, like the case of the downslope road, the manual movable body with wheels 10 can remain in a place with a hand-off by the user in a manner the same that of a case in which it is moved on the level road.

In addition, in case where the manual movable body with wheels 10 climbs the slope, since the rotation of the travelling wheels 18 in the direction in which they forwardly move in the upward direction is not blocked by the rachet claws 116, it can upwardly move by manually rotating the travelling wheels 18, while, it can remain in a place with a hand-off by the user.

In particular, by providing the chain 110 between the first sprocket 102 provided on the travelling wheel 18 and the second sprocket 108 provided on the second gear 106 integrally rotated with the abutting roller 100, a close contact between the travelling wheel 18 and the abutting roller 100 can be secured, so that a bad influence on such a contact due to a bad road or a vibration can be avoided by the fact that the travelling wheel 18 and the abutting roller 100 being held together, although the structure becomes complicated. In addition, in case of the downslope road, by the tension imparting mechanism 118, the tension of the chain 110 can be increased so as to enhance such a close contact, the rotational force in the direction reverse to the direction in which the travelling wheel 18 is downwardly moved on the downslope can be reliably transmitted to the travelling wheel 18 by the chain 110.

According to the manual movable body with wheels 10 including the above structure, in a case where it is moved on a downslope road or an upslope road, the seated surface of the seat can be maintained to be horizontal, like a case of a level road, by adjustably holding the predetermined rotated position of the upper body frame 12 by rotating the upper body frame 12 about the first horizontal rotation shaft 16, in accordance with the inclination angle of the road surface on which it is moved, by means of the mechanism for adjustably holding the upper body frame 12.

Accordingly, in a case where it is moved on a downslope road or an upslope road, by reducing an overturn moment applying to the manual movable body with wheels 10, it can be manually operated in a manner the same as a case where it is moved on the level road, while the same time, the stability of the manual movable body with wheels 10 can be secured.

A second embodiment of the present invention will be described with reference to FIG. 8.

In the following description, with respect to the same elements as those in the first embodiment, an explanation thereabout is omitted by attaching the same reference numbers to those elements, and the technical feature of this embodiment will be described in detail.

The technical feature of this embodiment lies in that the chain 110 in the first embodiment is omitted, and thus, the first sprocket 102 and the second sprocket 108 are also omitted, in addition, the tension imparting mechanism 118 for the chain 110 is omitted.

More specifically, as shown in FIG. 8, each of the pair of abutting rollers 110 is shaped to be a gear, so that a pair of third gears 122 each of which mates with the corresponding abutting roller 110 is provided so as to integrally rotate with the travelling wheels 18 in a concentric manner. The rachet claw 116 is provided so as to bite into the corresponding gear-shaped abutting roller 100, unlike the first embodiment, and is set to allow the rotation of the corresponding gear-shaped abutting roller 100 only in one direction, like the first embodiment.

In the first embodiment, each of the pair of travelling wheels 18 and the corresponding abutting roller 100 are held together by the corresponding chain 110 and the corresponding tension imparting mechanism 118 for the chain 110, so that a close contact between the travelling wheels 18 and the corresponding abutting roller 100 can be maintained, whereby a bad influence on such a close contact due to a bad road or a vibration can be avoided, while, in this embodiment, a plate 128 and a spring 43 are provided as an alternative for the chain 110 and the tension imparting mechanism 118 for the chain 110.

More specifically, the second horizontal rotation shaft 36 for the abutting rollers 100 extends between the opposed side surfaces 27 of the pair of the upper frameworks 32, and the plate 128 is provided between the opposed side surfaces 27 in such a way that its plane portion is oriented vertically and the second horizontal rotation shaft 36 extends through the plate 128. The spring 43 is provided between the plate 128 and the first horizontal rotation shaft 16. Each of the abutting rollers 100 is biased toward the first horizontal rotation shaft 16 via the plate 128 by the biasing force of the spring 43. This causes the abutting rollers 100 to be maintained to be in contact with the outer peripheral surface of the travelling wheels 18, although the lower body frame 14 supporting the traveling wheels 18 and the upper body frame 12 supporting the abutting rollers 100 are set to be non-contact.

In this connection, like the first embodiment, each of the pair of abutting rollers 100 is positioned on a front side of the manual movable body with wheels 10 relative to a line between the first horizontal rotation shaft 16 and the point N of contact of the travelling wheel 18 in such a way that its rotation force can be transmitted to the corresponding travelling wheel 18, while the upper body frame 12 can be supported thereby and is provided so as to be in contact with the corresponding travelling wheel 18 at a predetermined center angle about the first horizontal rotation shaft without causing slippage relative to the corresponding travelling wheel 18.

According to the above structure, the cost of the manual movable body with wheels 10 can be reduced, while at the same time, in case where the manual movable body with wheels 10 is moved on the downslope or upslope road, the manual movable body with wheels 10 can be manually operated, while its stability can be secured, like the case where it is moved on a level road by omitting the chain 100, and thus, the first and second sprockets 102, 108, and the tension imparting mechanism 118.

A third embodiment of the present invention will be described with reference to FIGS. 9 and 10.

In the following description, with respect to the same elements as those in the first embodiment, an explanation thereabout is omitted by attaching the same reference numbers to those elements, and the technical feature of this embodiment will be described in detail.

The technical feature of this embodiment lies in the positions at which the pair of abutting rollers 100 are provided. In the first embodiment, each of the pair of abutting rollers 100 is provided so as to circumscribe the corresponding travelling wheel 18, while, in this embodiment, each of the pair of abutting rollers 100 is provided so as to inscribe the corresponding travelling wheel 18.

More specifically, as shown in FIGS. 9 and 10, each of said pair of travelling wheels includes a tire portion and an annular rim portion supporting the tire portion, each of said pair of abutting rollers is provided on an inner space of an annular rim portion of the corresponding travelling wheel 18 so as to inscribe the corresponding travelling wheel 18 at a predetermined center angle α about said first horizontal rotation shaft in such a way that said upper body frame can be supported thereby and its rotation force of each of said pair of the abutting rollers can be transmitted to the corresponding travelling wheel 18.

A manual movable body with wheels 10, wherein each of pair of travelling wheels 18 includes a tire portion and an annular rim portion supporting the tire portion, each of pair of abutting rollers is provided on an inner space of an annular rim portion of the corresponding travelling wheel 18 so as to inscribe the corresponding travelling wheel 18 at a predetermined center angle α about first horizontal rotation shaft 16 in such a way that upper body frame 12 can be supported thereby and its rotation force of the abutting rollers can be transmitted to the corresponding travelling wheel 18.

According to the above structure, since the pair of abutting rollers 100 are provided by effectively utilizing the inner space 28 of the annular rim portion of the travelling wheels 18, as compared with the first embodiment, there is no need to secure a new space for providing the pair of abutting rollers 100. In addition, although, in the first embodiment, there is a risk of the variation of the abutting relationship between the abutting rollers 100 and the travelling wheels 18 due to the attachment of foreign objects on the outer peripheral surface of the travelling wheels 18, since the pair of abutting rollers 100 do not circumscribe the outer peripheral surface of the travelling wheels 18, but inscribe the annular rim portions, such a risk can be reduced.

The embodiment of the present invention has been described in detail above. A person skilled in the art may make various modifications and changes insofar as they are not out of the scope of the present invention.

For example, in the first embodiment, a description has been given on the case where the wheelchair is adopted. However, the embodiment is not limited to the case described above. For instance, a baby carriage including at its rear portion a gripping portion for hand-push, or a handcart for carrying goods including at its rear portion a gripping portion for hand-push and at the upper body frame 12 a load-carrying platform may be adopted.

For example, in the first to third embodiments, a description has been given on the case where the wheelchair can be manually operated in a manner same as that in which it is moved on the level road, in case of the downslope and upslope roads. However, the embodiment is not limited to the case described above. For instance, in case of the handcart, it is presumed that the user grips a gripping portion for hand-push form behind, so that a case where it forwardly moves in the downward direction on the downslope road is more serious than a case where it rearwardly moves in the upward direction on the upslope road.

In such a case, in each of the first to third embodiments, the rachet claws 116 for the upslope road can be omitted.

For example, in the first and second embodiments, a description has been given on the wheelchair including the annular rim portion, the spoke portion, and the tire. However, the embodiment is not limited to the case described above. For instance, a travelling wheel 18 of a disk type can be adopted. In such a case, since there is no inner space in the travelling wheel 18, it is considered to be technically difficult to make the pair of abutting rollers inscribe the travelling wheels 18, like the third embodiment.

For example, in the second embodiment, a description has been given on the case where each of the pair of gear-shaped abutting rollers are provided so as to circumscribe the corresponding travelling wheel 18. However, the embodiment is not limited to the case described above. For instance, each of the pair of gear-shaped abutting rollers may be provided so as to inscribe the corresponding travelling wheel 18.

For example, in the first to third embodiments, a description has been given on the case where the structure of the left travelling wheel 18 is the same as that of the right travelling wheel 18. However, the embodiment is not limited to the case described above. For instance, in the left travelling wheel 18, the structure in which the chain 110 is included may be adopted, while, in the right travelling wheel 18, the structure in which the pair of the gear-shaped abutting rollers 100 is included, instead of the chain 110 may be adopted. In such a case, in both of the left and right travelling wheels 18, the pair of abutting rollers may be provided so as to circumscribe the travelling wheels 18, or they may be provided so as to inscribe the travelling wheels 18, or one of the left and right travelling wheels 18 may be provided so as to circumscribe the corresponding travelling wheel 18, while the other of the left and right travelling wheels 18 may be provided so as to inscribe the corresponding travelling wheel 18.

DESCRIPTION OF REFERENCE SIGNS

Figure 1:
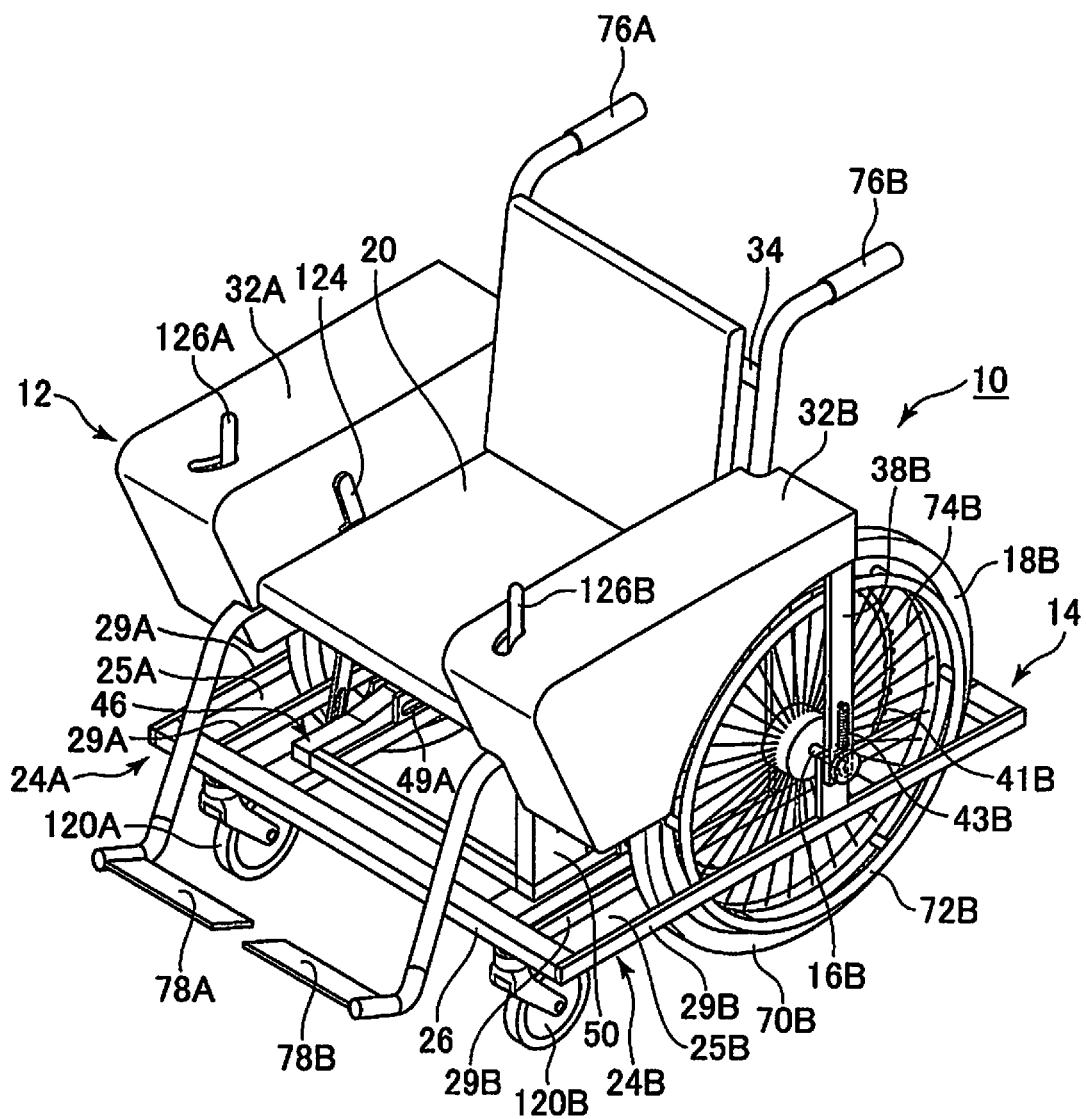
FIG. 1 is a perspective view illustrating the wheelchair according to the first embodiment of the present invention.
Figure 2:
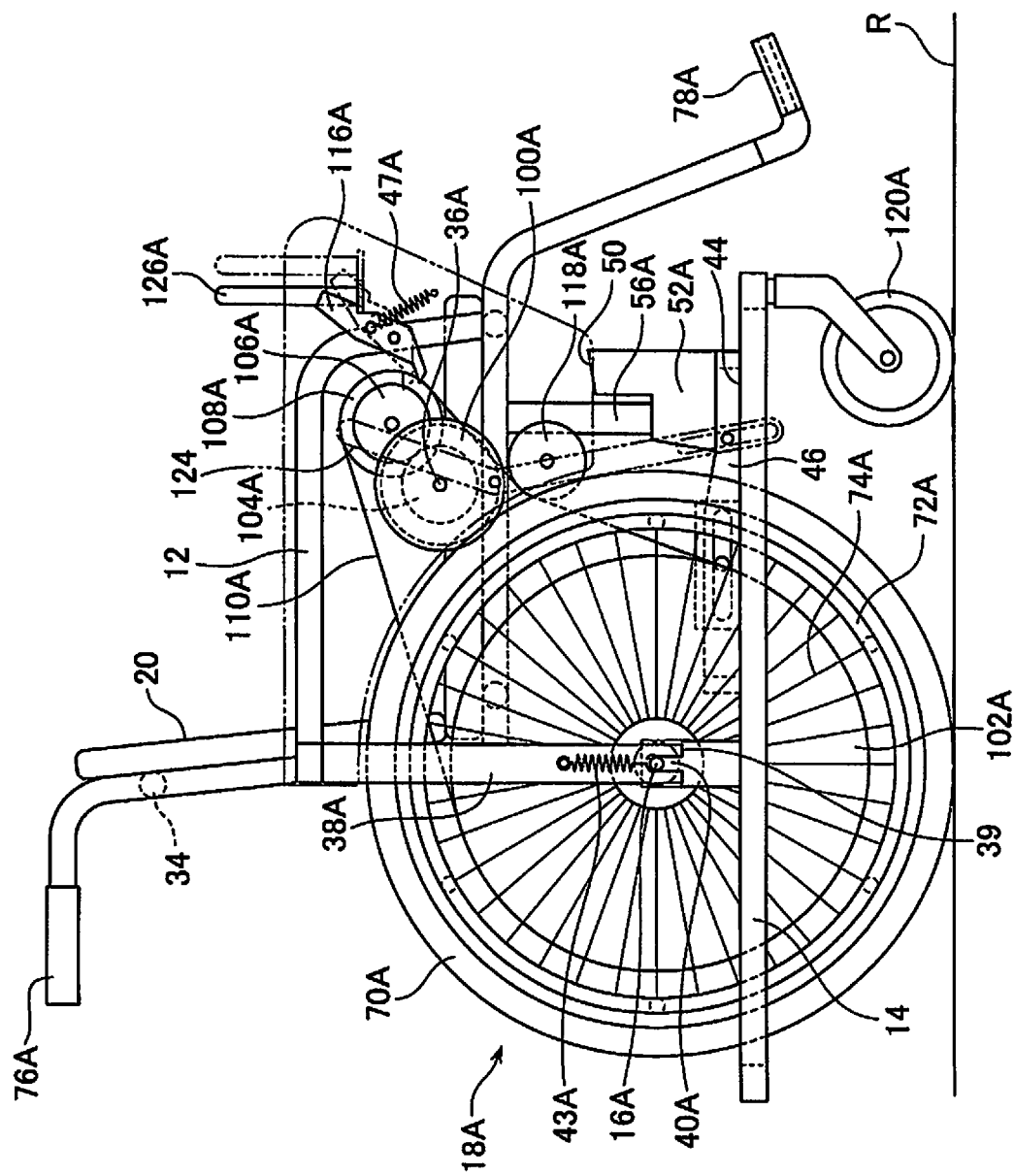
FIG. 2 is a side view illustrating the wheelchair according to the first embodiment of the present invention.
Figure 3:
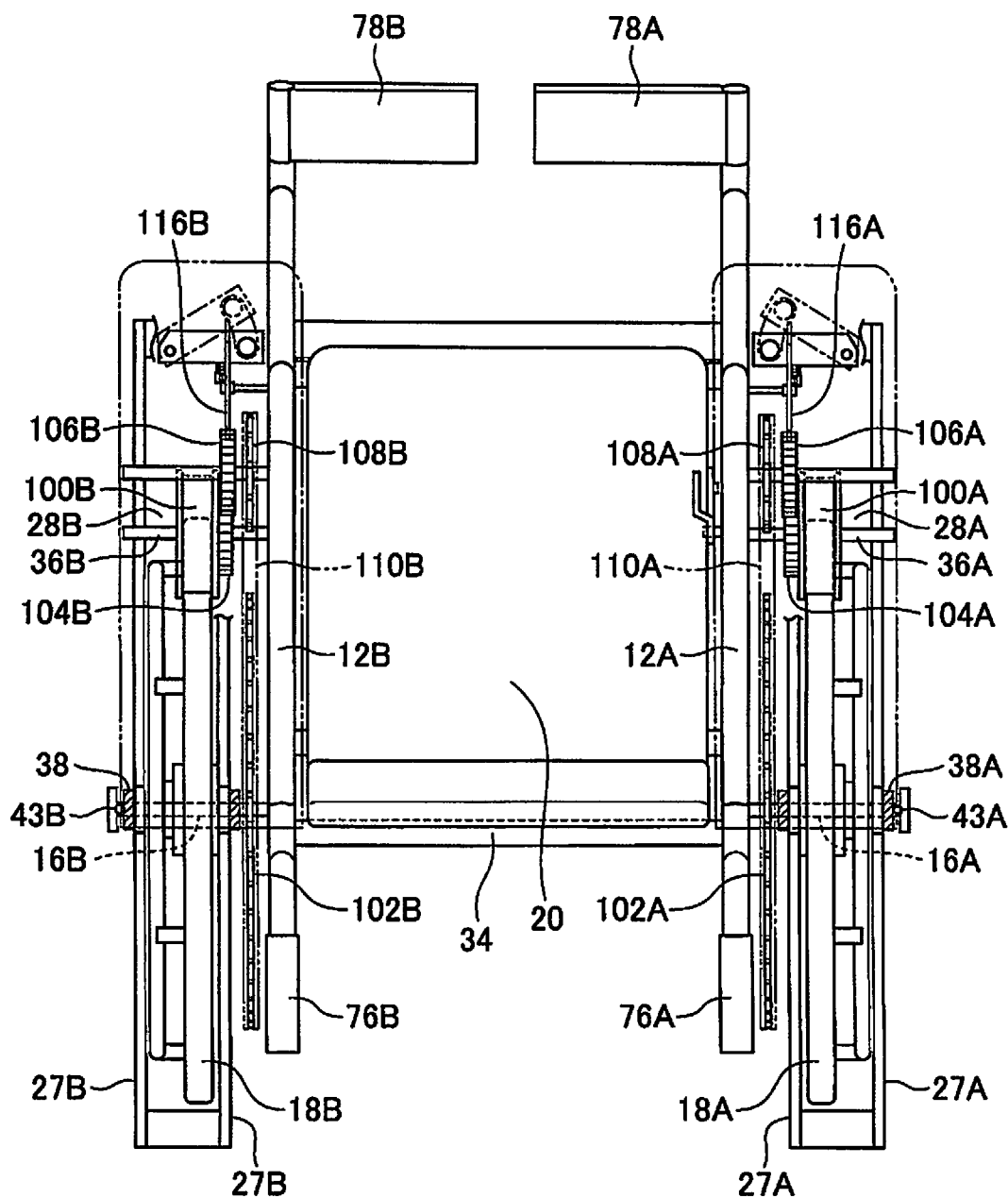
FIG. 3 is a top view illustrating the wheelchair according to the first embodiment of the present invention.
Figure 4:
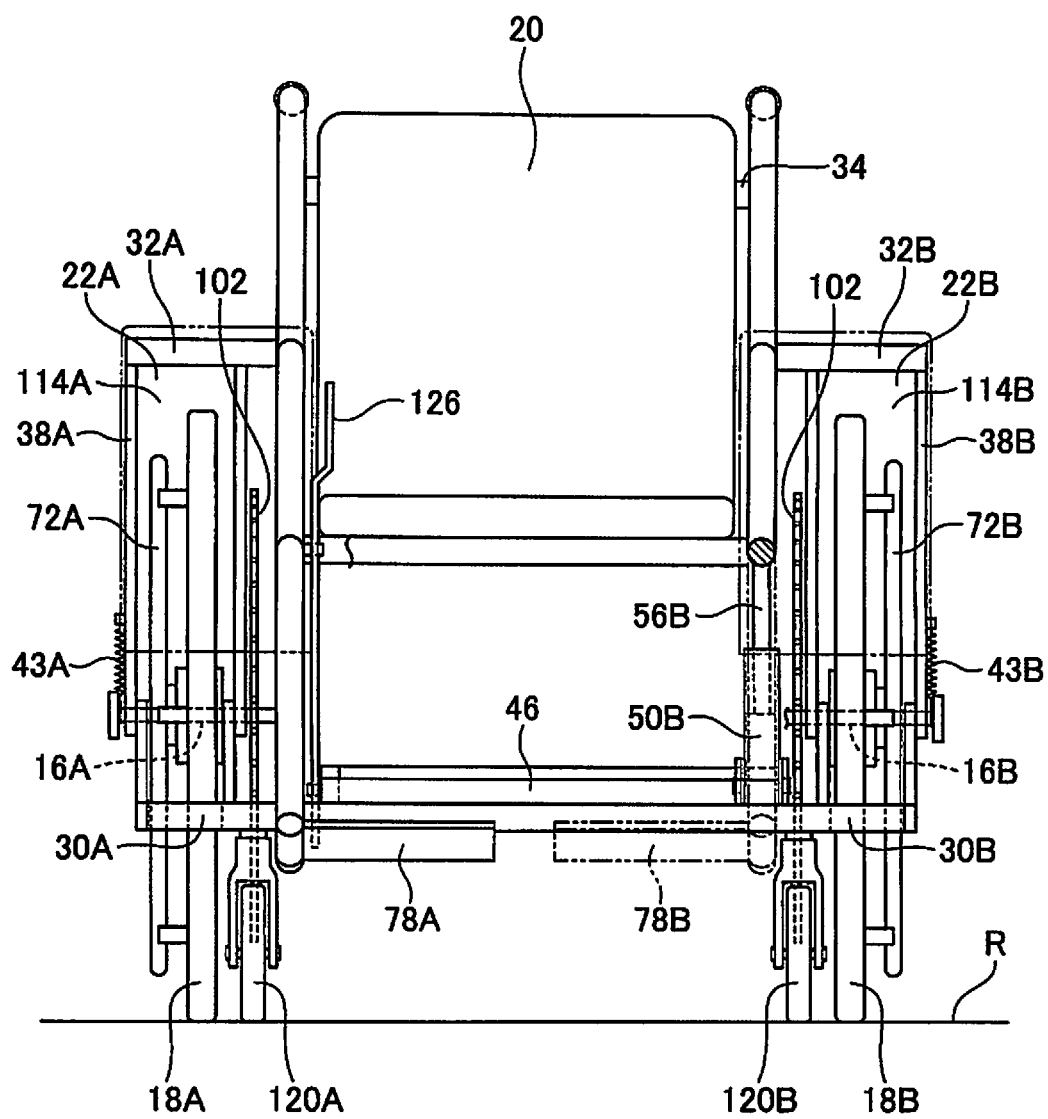
FIG. 4 is a back view illustrating the wheelchair according to the first embodiment of the present invention.
Figure 5:
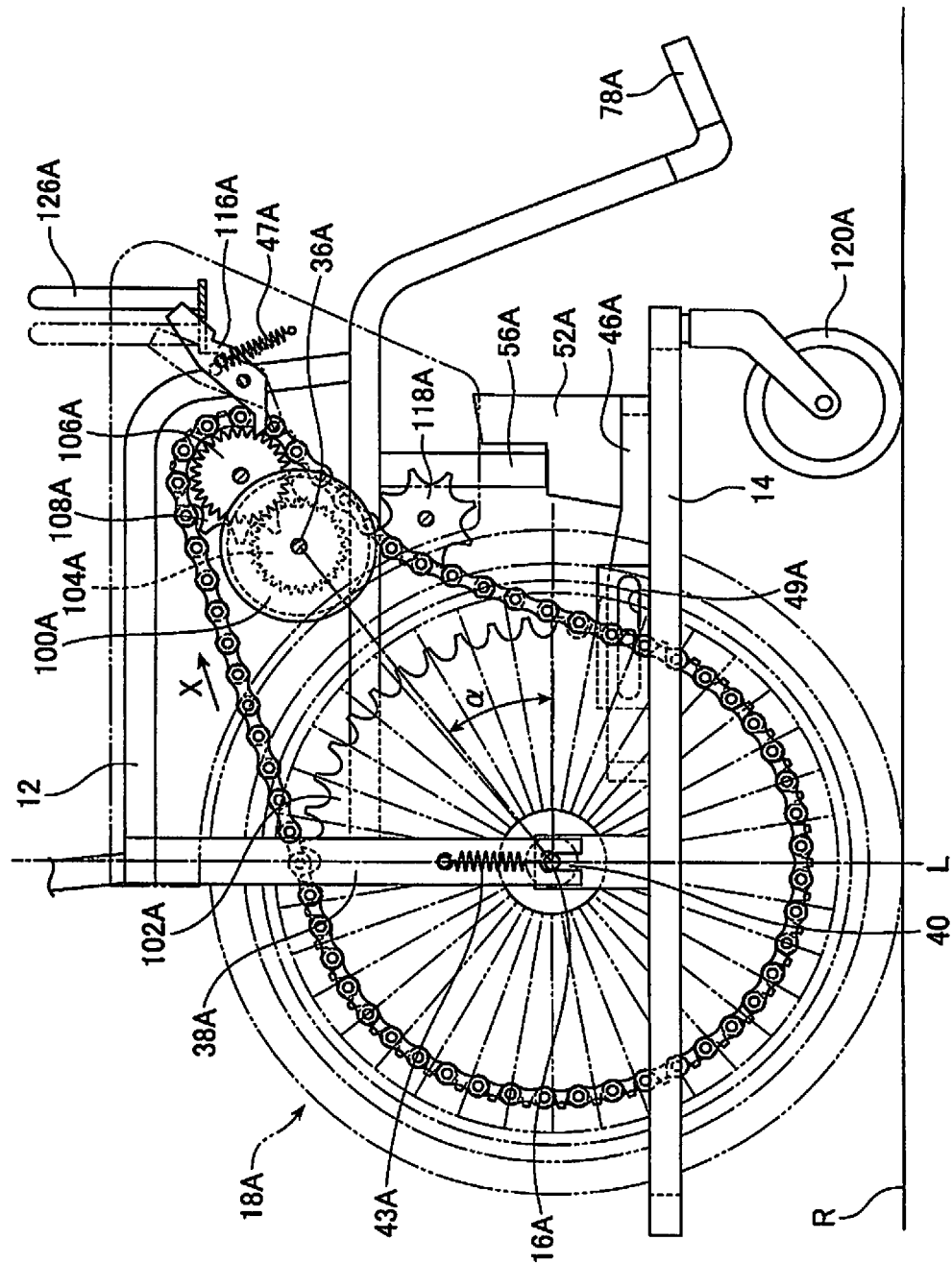
FIG. 5 is a partial detailed cross-sectional view illustrating the structure of the travelling wheels 18 of the wheelchair according to the first embodiment of the present invention.
Figure 6:
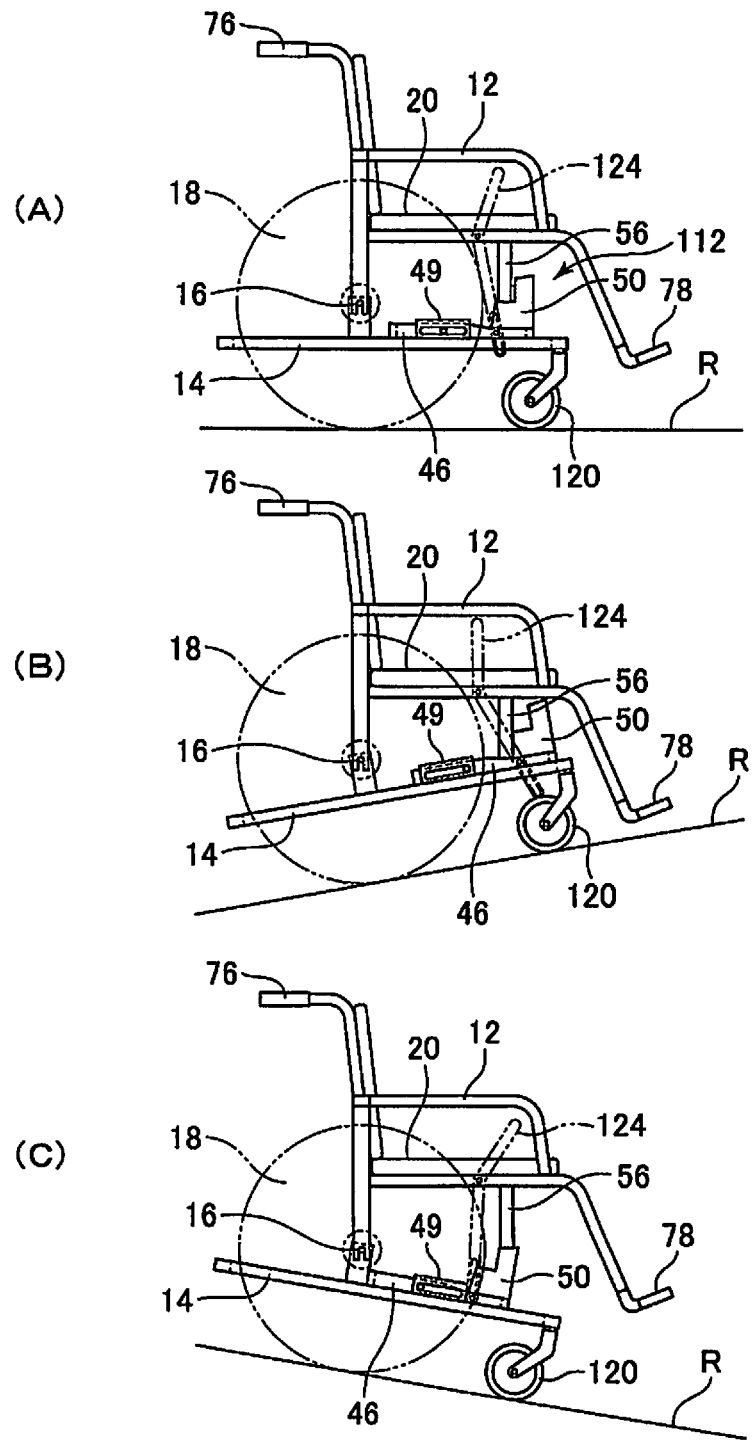
FIG. 6 is a view illustrating situations in which the wheelchair according to the first embodiment of the present invention is on the level road, on the upward slope, and on the downward slope.
Figure 7:
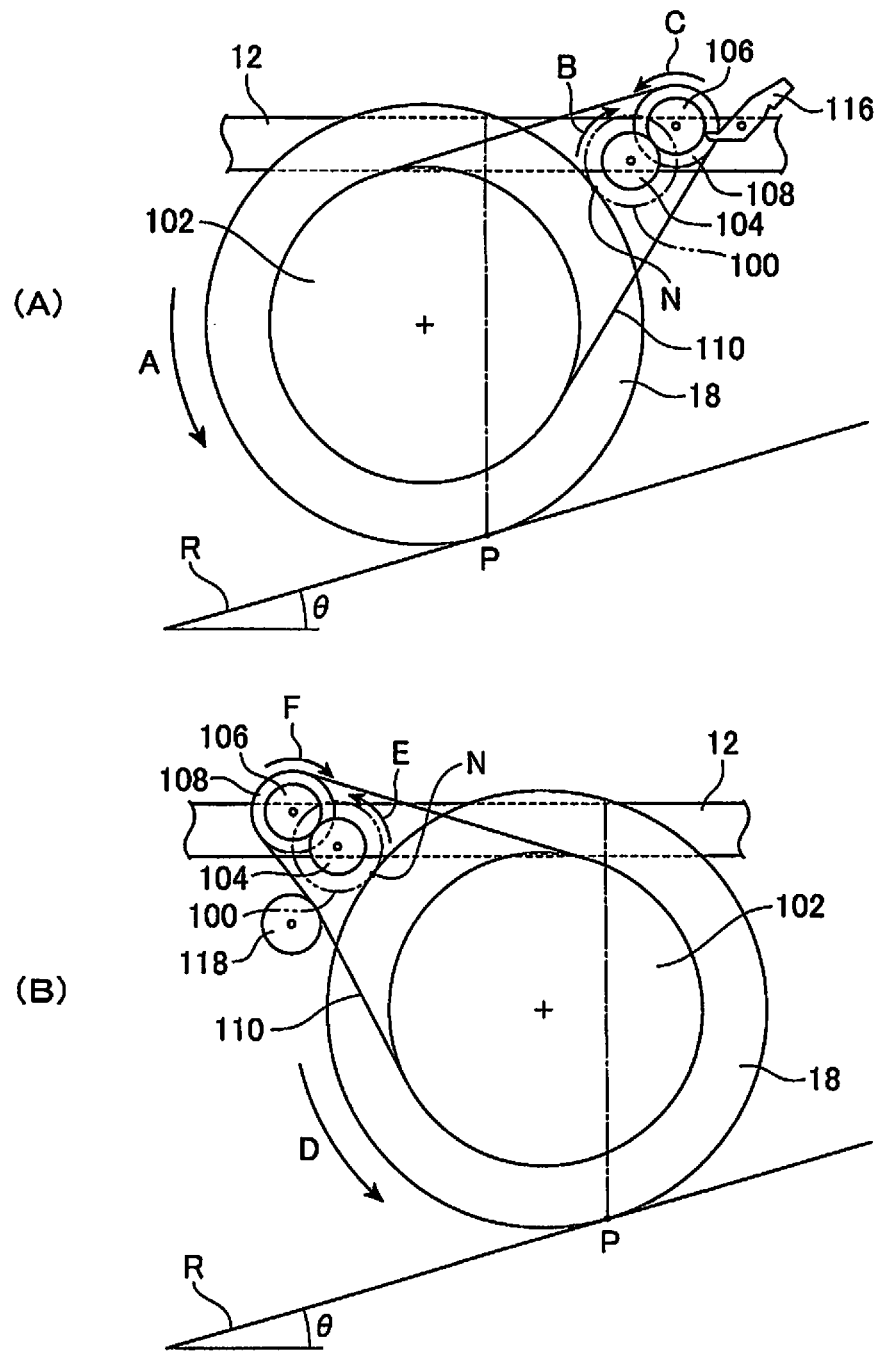
FIG. 7 is a view illustrating the effect of the structure of the travelling wheels of the wheelchair according to the first embodiment of the present invention when the wheelchair is on the upward slope, and on the downward slope.
Figure 8:
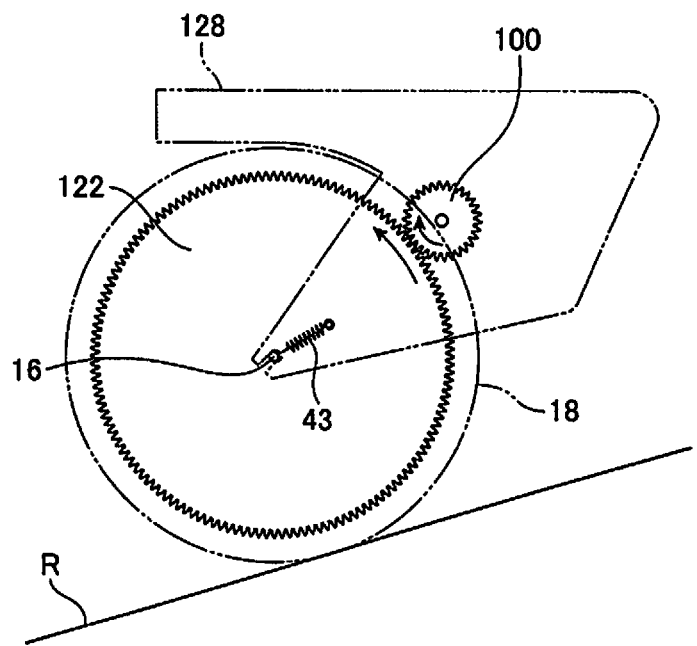
FIG. 8 is a view similar to FIG. 7 illustrating the structure of the travelling wheels of the wheelchair according to the second embodiment of the present invention.
Figure 9:
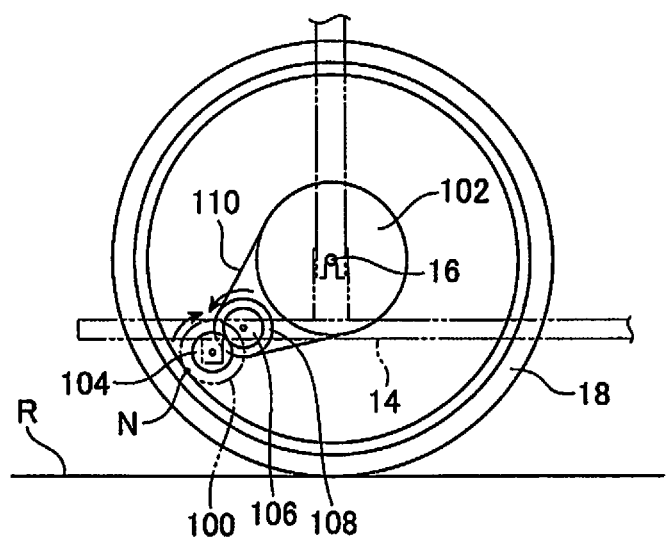
FIG. 9 is a view similar to FIG. 7 illustrating the structure of the travelling wheels of the wheelchair according to the third embodiment of the present invention.
Figure 10:
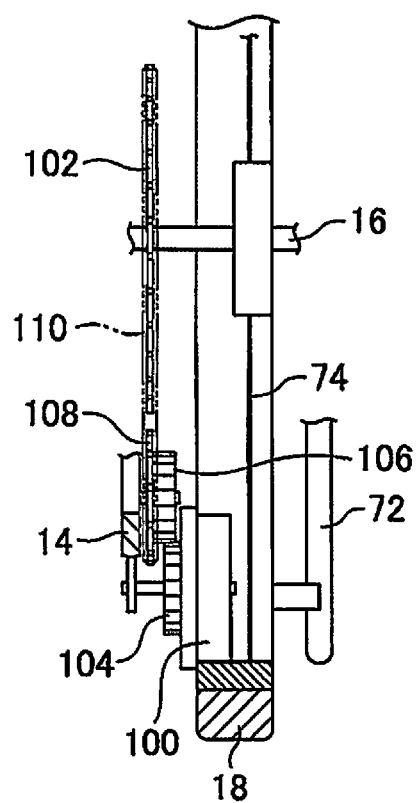
FIG. 10 is a partial side view illustrating the structure of the travelling wheels of the wheelchair according to the third embodiment of the present invention.

R road surface
α center angle
N point of contact
Θ inclination angle of road surface
L line passing point of contact and first horizontal rotation shaft
10 manual movable body with wheels
12 upper body frame
14 lower body frame
16 first horizontal rotation shaft
18 a pair of travelling wheels
20 seat
22 elongate lower opening
24 a pair of lower frameworks
25 space
26 widthwise lower frame
27 side surface
28 space
29 side surface
30 elongate upper opening
32 a pair of upper frameworks
34 widthwise upper frame
36 second horizontal rotation shaft
39 lower end
40 notch
41 spring
43 spring
46 mobile framework
47 spring
49 guide portion
50 a plurality of stepped portions
54 biasing portion
56 locking portion
70 tire
72 rim
74 spoke portion
76 handle portion
78 foot plate
100 a pair of abutting rollers
102 first sprocket
104 first gear
106 second gear
108 second sprocket
110 chain
112 mechanism for adjustably holding upper body frame
116 ratchet claw
118 tension imparting mechanism
120 a pair of auxiliary wheels
122 third gear
124 lever
126 lever
128 plate

The invention claimed is:

1. A manual movable body, comprising:
   an upper body frame for supporting a load,
   a pair of travelling wheels for moving the manual movable body by rotating the travelling wheels, each of the travelling wheels being provided on a corresponding side of a lower body frame, the lower body frame not being in contact with said upper body frame, and each of the travelling wheels being rotationally supported by a first horizontal rotation shaft extending in a widthwise direction of the lower body frame, and a pair of abutting rollers, each of the pair of abutting rollers being mounted on said upper body frame, and each of the pair of abutting rollers being rotationally supported by a second horizontal rotation shaft extending in a widthwise direction of the upper body frame, each of the pair of abutting rollers being positioned on a front side of said manual movable body relative to a line between said first horizontal rotation shaft and a point of contact of said travelling wheels with a road surface in such a way that a roller rotation force of each of the abutting rollers can be transmitted to a corresponding one of the travelling wheels while the upper body frame is also supported by the abutting rollers, and each of the abutting rollers being provided so as to be in contact with the corresponding one of the travelling wheels at a predetermined center angle of 30 degrees to 60 degrees about the first horizontal rotation shaft without causing slippage relative to the corresponding one of the travelling wheels, such that the load supported by said upper body frame is applied on a point of contact between each of said pair of abutting rollers and the corresponding one of the travelling wheels via said pair of abutting rollers without being applied on said first horizontal rotation shaft for said travelling wheels, wherein a mechanism is provided that is adapted to secure a close contact between an associated one of the travelling wheels and an associated one of the abutting rollers, wherein when said manual movable body is on a downslope road surface, a force in a first rotation direction reverse to a second rotation direction of said pair of travelling wheels when said manual movable body is downwardly moved is applied on said pair of travelling wheels via said pair of abutting rollers.

2. The manual movable body according to claim 1, wherein each of said pair of abutting rollers comprises a first gear, and a pair of second gears, each of which mates with a corresponding one of the abutting rollers and is mounted on a corresponding one of the travelling wheels, are provided so as to integrally rotate with said pair of travelling wheels in a concentric manner.

3. The manual movable body according to claim 1, further comprising:
  a pair of first sprockets, each of the pair of first sprockets integrally rotating with a corresponding one of the travelling wheels in a concentric manner,
  a pair of first gears, each of the pair of first gears integrally rotating with a corresponding one of the abutting rollers in a concentric manner,
  a pair of second gears, each of the pair of second gears including a gear shape the same as that of a corresponding one of the first gears and each of the pair of second gears mating with a corresponding one of the first gears,
  a pair of second sprockets, each of the pair of second sprockets integrally rotating with a corresponding one of the pair of second gears in a concentric manner,
  a pair of chains, each of the pair of chains being wound over between corresponding ones of the first sprockets and the second sprockets, and
  a pair of tension imparting mechanisms, each of the pair of tension imparting mechanisms imparting a tension force to a corresponding one of the chains, a ratio of a diameter of each of said travelling wheels with that of said abutting rollers is set to be the same as a ratio of the number of teeth of each of said first sprockets with that of said second sprockets,
  whereby, when said manual movable body is on the downslope road surface, the force in the first rotation direction reverse to the second rotation direction of said pair of travelling wheels when said manual movable body with wheels is downwardly moved is applied on said pair of travelling wheels via said pair of chains.

4. The manual movable body with wheels according to claim 3, further including a pair of rachet claws, each of the ratchet claws being provided on each of said second gears so as to bite between the teeth of the second gears to allow rotation of the second gears only in one direction.

5. The manual movable body according to claim 4, wherein said manual movable body is a wheelchair including a seat at said upper body frame, said first horizontal rotation shaft being provided on a rear side of said manual movable body in a longitudinal direction of said manual movable body, said upper body frame being provided so as to rotate about said first horizontal rotation shaft relative to said lower body frame, and said manual movable body further comprising a mechanism for holding the upper body frame which adjustably holds said upper body frame at a predetermined rotated position, in accordance with an inclination angle of the road surface on which said manual movable body is moved.

6. The manual movable body according to claim 5, wherein said lower body frame comprises a pair of lower frameworks each of which includes an elongate lower opening, and a widthwise lower frame connecting said pair of lower frameworks, said first horizontal rotation shaft extending between opposed side surfaces of said pair of lower frameworks, and each of said pair of travelling wheels being provided in a space between said pair of lower frameworks.

7. The manual movable body according to claim 6, wherein said upper body frame comprises a pair of upper frameworks each of which includes an elongate upper opening and constitutes an arm rest, and a widthwise upper frame connecting said pair of upper frameworks, said second horizontal rotation shaft extending between opposed side surfaces of said pair of upper frameworks, and the seat provided in a space between said pair of upper frameworks.

8. The manual movable body according to claim 7, further comprising a mobile framework bridging upper surfaces of inner side plates of said pair of lower frameworks to be movably rested on the upper surfaces in a sliding manner in the longitudinal direction of the manual movable body,
  a stair portion including a plurality of stepped portions, the plurality of stepped portions having upper portions each of which gets higher in a forward direction of the manual movable body,
  a biasing portion biasing said mobile framework in the longitudinal direction of the manual movable body, and
  a locking portion which is provided on one of said pair of upper frameworks and locks against said plurality of stepped portions from behind,
  whereby an inclination angle of said upper body frame can be adjusted.

9. The manual movable body according to claim 8, said plurality of stepped portions includes a rear portion in the longitudinal direction of the manual movable body for an upward slope road surface, a front portion in the longitudinal direction of the manual movable body for a downward slope road surface, and an intermediate portion for a level road surface.

10. The manual movable body according to claim 9, a position of the point of contact between each of the pair of abutting rollers and the corresponding one of the travelling wheels can be adjusted by said locking portion.

11. The manual movable body according to claim 7, further comprising a pair of vertical frames each of which extends from an outer surface of a corresponding one of said pair of upper frameworks toward a corresponding one of said pair of lower frameworks, a pair of notches, each of the notches being provided on a lower end of each of said vertical frames so as to hold said first horizontal rotation shaft, a gap is secured between an upper end of a corresponding one of the notches and said first horizontal rotation shaft in a situation where each of said pair of abutting rollers is in contact with the corresponding one of the travelling wheels, and the elongate lower opening of said lower body frame is aligned with the elongate upper opening of said upper body frame, whereby each of said travelling wheels, said first and second sprockets, said first and second gears, and said chains are disposed in a vertical space between corresponding sets of the elongate upper and lower openings.

12. The manual movable body according to claim 11, wherein each of said pair of first sprockets includes a diameter smaller than that of a corresponding one of the travelling wheels and is provided inside relative to the corresponding one of the travelling wheels.

13. The manual movable body according to claim 11, further including a pair of auxiliary wheels, each of the pair of auxiliary wheels being provided on a front end of one of said pair of lower frameworks.

14. The manual movable body according to claim 11, wherein each of said pair of abutting rollers is provided on the rear side of said manual movable body relative to said first horizontal rotation shaft of said travelling wheels at a predetermined center angle of 30 degrees to 60 degrees relative to a horizontal line, so as to circumscribe a corresponding one of the travelling wheels from outside, and a pair of auxiliary wheels are provided on said pair of lower frameworks in such a way that each of the pair of auxiliary wheels is provided on a rear end of a corresponding one of the lower frameworks.

15. The manual movable body according to claim 11, further comprising a spring provided between said upper body frame and said first horizontal rotation shaft so as to restrict a vertical movement of said upper body frame relative to said lower body frame.

16. The manual movable body according to claim 1, further comprising a hand rim portion by which a rotation force can be manually transmitted to said travelling wheels and which is provided on at least one of said pair of travelling wheels and said pair of abutting rollers.

17. The manual movable body according to claim 1, wherein each of said pair of travelling wheels includes a tire portion and an annular rim portion supporting the tire portion, each of said pair of abutting rollers being provided on an inner space of an annular rim portion of a corresponding one of the travelling wheels so as to inscribe the corresponding one of the travelling wheels at a predetermined center angle about said first horizontal rotation shaft in such a way that said upper body frame can be supported thereby and the roller rotation force of each of said pair of the abutting rollers can be transmitted to the corresponding travelling wheels.

* * * * *